(12) United States Patent
Tokunaga et al.

(10) Patent No.: US 11,011,832 B2
(45) Date of Patent: May 18, 2021

(54) RADIO WAVE TRANSPARENT COVER

(71) Applicant: TOYODA GOSEI CO., LTD., Kiyosu (JP)

(72) Inventors: Seiya Tokunaga, Kiyosu (JP); Hideto Maeda, Kiyosu (JP); Kimihiro Iimura, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 63 days.

(21) Appl. No.: 16/213,133

(22) Filed: Dec. 7, 2018

(65) Prior Publication Data
US 2019/0190135 A1 Jun. 20, 2019

(30) Foreign Application Priority Data
Dec. 18, 2017 (JP) .............................. JP2017-241954

(51) Int. Cl.
 *H01Q 1/32* (2006.01)
 *G01S 7/03* (2006.01)
 *H01Q 1/42* (2006.01)
 *G01S 13/931* (2020.01)

(52) U.S. Cl.
CPC ............ *H01Q 1/3233* (2013.01); *G01S 7/03* (2013.01); *H01Q 1/3283* (2013.01); *H01Q 1/42* (2013.01); *H01Q 1/421* (2013.01); *G01S 13/931* (2013.01)

(58) Field of Classification Search
CPC ........ H01Q 1/3233; H01Q 1/42; H01Q 1/421; H01Q 1/422; H01Q 1/424; H01Q 1/425; H01Q 1/427; H01Q 1/428
See application file for complete search history.

(56) References Cited

U.S. PATENT DOCUMENTS

| 3,432,859 A | * | 3/1969 | Plant | ...................... H01Q 1/422 |
| | | | | 343/872 |
| 2007/0109206 A1 | * | 5/2007 | Fujii | ...................... B60R 13/005 |
| | | | | 343/711 |
| 2010/0028610 A1 | * | 2/2010 | Fujii | ...................... H01Q 1/3233 |
| | | | | 428/164 |
| 2018/0207900 A1 | * | 7/2018 | Kosugi | ...................... B32B 3/12 |

FOREIGN PATENT DOCUMENTS

| JP | 2007-248167 A | 9/2007 |
| JP | 2012-225731 A | 11/2012 |
| JP | 2012-225733 A | 11/2012 |

* cited by examiner

*Primary Examiner* — Daniel Munoz
(74) *Attorney, Agent, or Firm* — Posz Law Group, PLC

(57) ABSTRACT

A radio wave transparent cover is arranged in front of a radio wave radar device with a space in between in a radio wave emitting direction of the radio wave radar device such that radio waves emitted from the radio wave radar device pass through the inside of the radio wave transparent cover. A formation area, which includes the entire radio wave transparent area on the back side of the cover, is formed by an embossed uneven surface having an embossing depth of a range of 5 μm to 200 μm, inclusive.

7 Claims, 5 Drawing Sheets

RADIO WAVE TRANSPARENT COVER

BACKGROUND

The following description relates to a radio wave transparent cover arranged in a radio wave path of a radio wave radar device.

Radio wave radar devices have been put in practical use and mounted in vehicles such as automobiles. Such a radio wave radar device emits radio waves, such as millimeter waves and microwaves, and detects nearby vehicles and obstacles by measuring reflected waves of the emitted radio waves.

When mounted on the outside of a vehicle, a radio wave radar device can degrade the aesthetic appearance of the vehicle. For this reason, a radio wave transparent cover (hereinafter, simply referred to as a cover) has been put in practical use. Such a cover is typically placed on the outer side of a radio wave radar device (for example, refer to Japanese Laid-Open Patent Publication No. 2007-248167). The cover conceals the radio wave radar device from the outside of the vehicle and has a radio wave transparency. This cover is arranged on the front side of the radio wave radar device in the radio wave emitting direction in a manner obstructing the radio wave path. This allows radio waves emitted from the radio wave radar device to travel to the outside of the vehicle through the cover and allows reflected waves to enter the radio wave radar device from the outside of the vehicle through the cover.

When such a cover is installed, some of the radio waves emitted from the radio wave radar device are reflected by a face of the cover that is closer to the radio wave radar device (back side). If these reflected waves are received by the radio wave radar device, the detection accuracy of the radio wave radar device may be reduced.

In this regard, Japanese Laid-Open Patent Publication No. 2007-248167 discloses a cover 120 shown in FIG. 9, which is inclined such that the angle of incidence θ of radio waves to the cover 120 is set to a predetermined angle at which the return loss of the radio waves is increased (in this publication, Brewster's angle (60 degrees)). This configuration reduces the influence of the reflected waves reflected by the back side of the cover 120, thereby limiting the reduction in the detection accuracy of the object detected by the radio wave radar device 110.

Although the use of the above-described cover limits the reduction in the detection accuracy of the radio wave radar device, the settable range of the cover installation angle will be limited. This is one of the factors that degrade the mountability of the cover, and thus the mountability of the radio wave radar device. In this respect, there is room for improvement in the above-described cover.

SUMMARY

An objective of the following description is to provide a radio wave transparent cover capable of improving the detection accuracy of a radio wave radar device while limiting the influence of the installation angle.

In accordance with one aspect of the present disclosure, a radio wave transparent cover is provided, which is arranged in front of a radio wave radar device with a space in between in a radio wave emitting direction of the radio wave radar device such that radio waves emitted from the radio wave radar device pass through the inside of the radio wave transparent cover. On a surface of the radio wave transparent cover on a side facing the radio wave radar device, at least a part of an area through which the emitted radio waves pass is formed by an uneven surface having a height from a bottom of a concave part to a tip of a convex part in a range from 5 μm to 200 μm, inclusive.

DETAILED DESCRIPTION

A radio wave transparent cover 20 according to embodiments will now be described.

First, a schematic configuration of a vehicle 10 equipped with the radio wave transparent cover 20 will be described.

Figure 1:
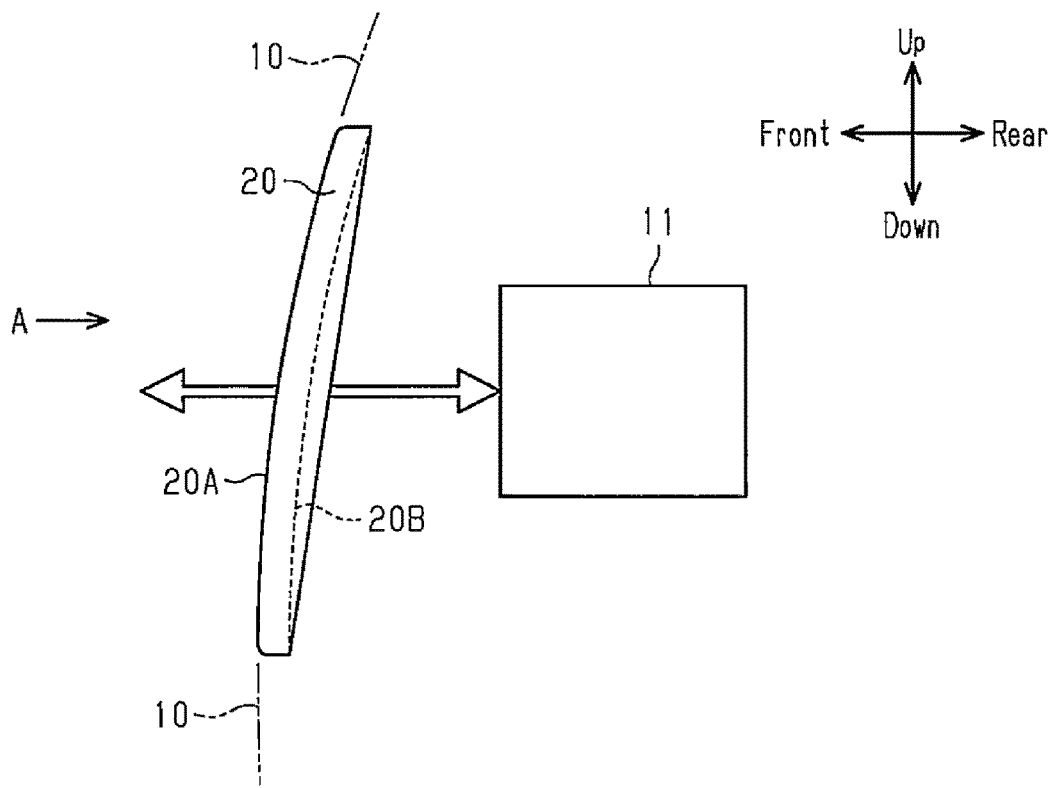
FIG. 1 is a diagram schematically showing the configuration of a vehicle in which a radio wave transparent cover according to an embodiment is used.

As shown in FIG. 1, the vehicle 10 includes a radio wave radar device 11 mounted in the front portion. The radio wave radar device 11 emits radio waves (millimeter waves) to the front of the vehicle 10 (left side as viewed in FIG. 1) and measures the reflected waves to detect the surrounding condition of the vehicle 10.

Figure 2:
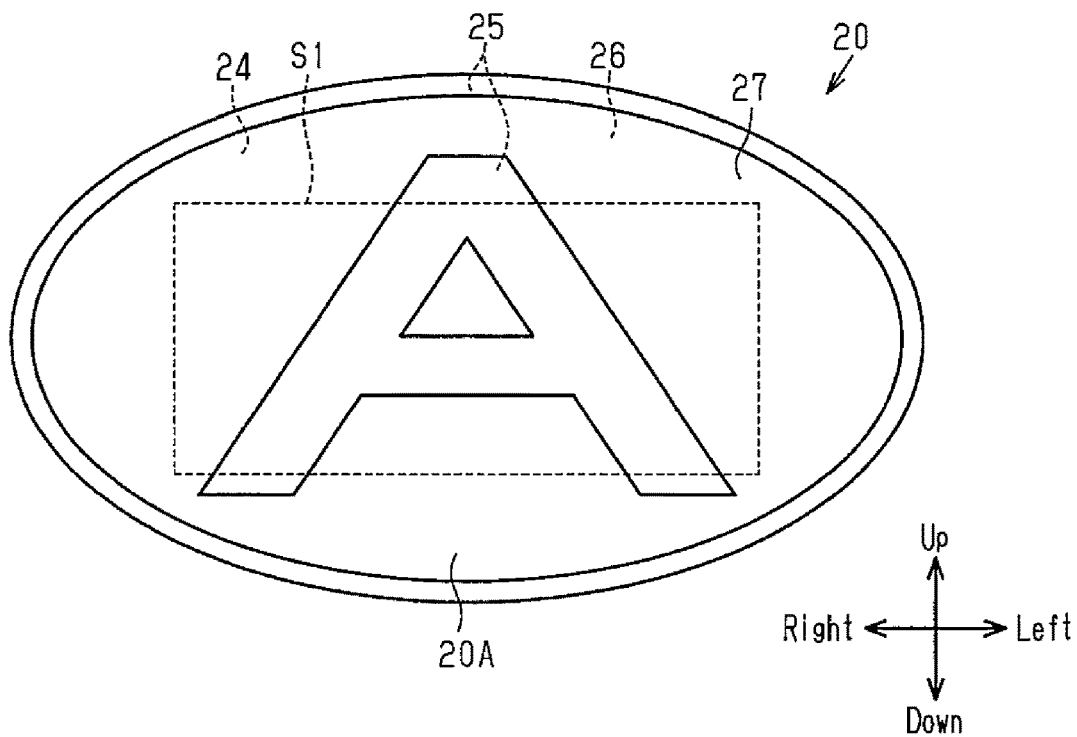
FIG. 2 is a front view of the cover.
Figure 3:
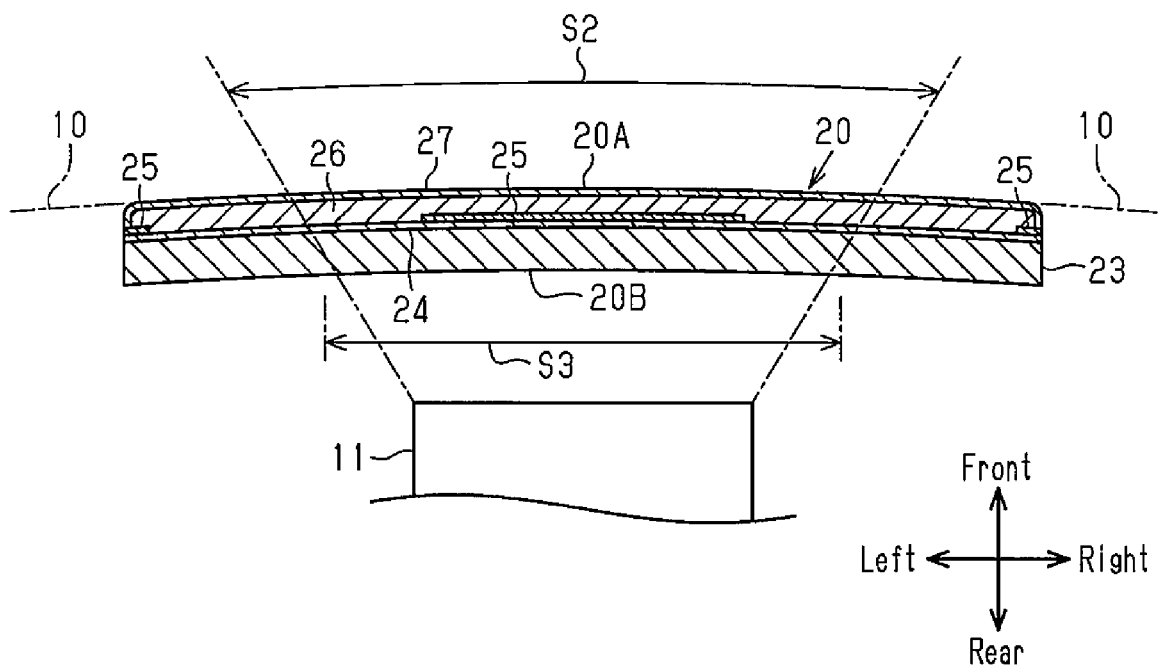
FIG. 3 is a cross-sectional plan view of the cover.

As shown in FIGS. 1 to 3, the radio wave transparent cover 20 (hereinafter, referred to as the cover 20) is arranged in front of the radio wave radar device 11 in the front portion of the vehicle 10. The cover 20 is an exterior component (for example, an emblem), of which the surface on the side farther from the radio wave radar device 11 (the facing side of the sheet of FIG. 2), that is, the surface facing the outside of the vehicle 10 (front side 20A) forms a part of the outer surface of the vehicle 10. The cover 20 conceals the radio wave radar device 11 from the outside of the vehicle 10.

The cover 20 is located on the front side of the radio wave radar device 11 in the radio wave emitting direction (left side as viewed in FIG. 1) in a manner obstructing the radio wave path of the radio wave radar device 11 (the blank arrows in FIG. 1). Specifically, the cover 20 is arranged on the outer side of the radio wave radar device 11 with a space in between such that the radio waves emitted from the radio wave radar device 11 and the reflected waves to be measured by the radio wave radar device 11 pass through the central portion of the cover 20 (the radio wave transparent area S1 indicated by the broken line in FIG. 2). The area indicated by the long dashed short dashed lines and arrow S2 in FIG. 3 indicates the area through which radio waves emitted from the radio wave radar device 11 pass.

The structure of the cover 20 will now be described in detail.

As shown in FIG. 2, the cover 20 is a substantially elliptical plate in the front view (as viewed in the direction of arrow A in FIG. 1), however, embodiments are not limited thereto, and the cover could be any shape. As shown in FIG. 3, the cover 20 has a multilayer structure, which includes a base 23, a paint layer 24, a metal film layer 25, a surface covering plate 26, and a hard coating layer 27 disposed in the order from the inner side (the lower side of FIG. 3). In FIG. 3, the thickness of the paint layer 24, the thickness of the metal film layer 25, and the thickness of the hard coating layer 27 are exaggerated in comparison with the actual thicknesses in order to facilitate understanding.

The base 23 may be made of an opaque black acrylonitrile-ethylene-styrene plastic (AES plastic). The paint layer 24 may be made of a black acrylic paint. The metal film layer 25 may be an island film made of indium. The surface covering plate 26 may be made of a colorless transparent polycarbonate (PC). The hard coating layer 27 may be made of a colorless transparent acrylic plastic.

The AES plastic (base 23), the acrylic paint (paint layer 24), the PC (surface covering plate 26), and the acrylic plastic (hard coating layer 27) are materials having a radio wave transparency, which allows radio waves to pass through. In addition, the island film made of indium (metal film layer 25) has a radio wave transparency, which allows radio waves to pass through. Therefore, the cover 20 has a radio wave transparency, which allows radio waves to pass through. It is noted that other materials may be used so long as they have similar radio wave transparency to those described above.

As shown in FIGS. 1 and 3, the cover 20 includes, in order from the outer side, the colorless and transparent hard coating layer 27 and the surface covering plate 26, the metallic-colored metal film layer 25, and the black paint layer 24 and the base 23. Thus, as shown in FIG. 2, when the cover 20 is seen from the outside of the vehicle 10, a pattern (an outer frame and a letter A, for example) in a metallic-color (metal film layer 25) is visible on a black background (paint layer 24) through the surface covering plate 26 and the hard coating layer 27.

The hard coating layer 27 and the surface covering plate 26 correspond to a front member that forms a part of the cover 20 on the front side in the radio wave emitting direction, and the paint layer 24 and the metal film layer 25 correspond to an ornamental member arranged between the front member and the base 23.

Since the cover 20 is provided, some of the radio waves emitted from the radio wave radar device 11 are reflected by the surface of the cover 20 that is closer to the radio wave radar device 11 (back side 20B). When received by the radio wave radar device 11, these reflected waves (hereinafter, surface reflected waves) become one of the factors that degrade the detection accuracy of objects (for example, nearby vehicles and obstacles) to be detected by the radio wave radar device 11.

Taking the above into consideration, the cover 20 of the present embodiment includes an uneven surface 28 on a part of the back side 20B of the cover 20 in order to limit the reduction in the detection accuracy of the radio wave radar device 11 due to the surface reflected waves. The uneven surface 28 will now be described.

Figure 4:
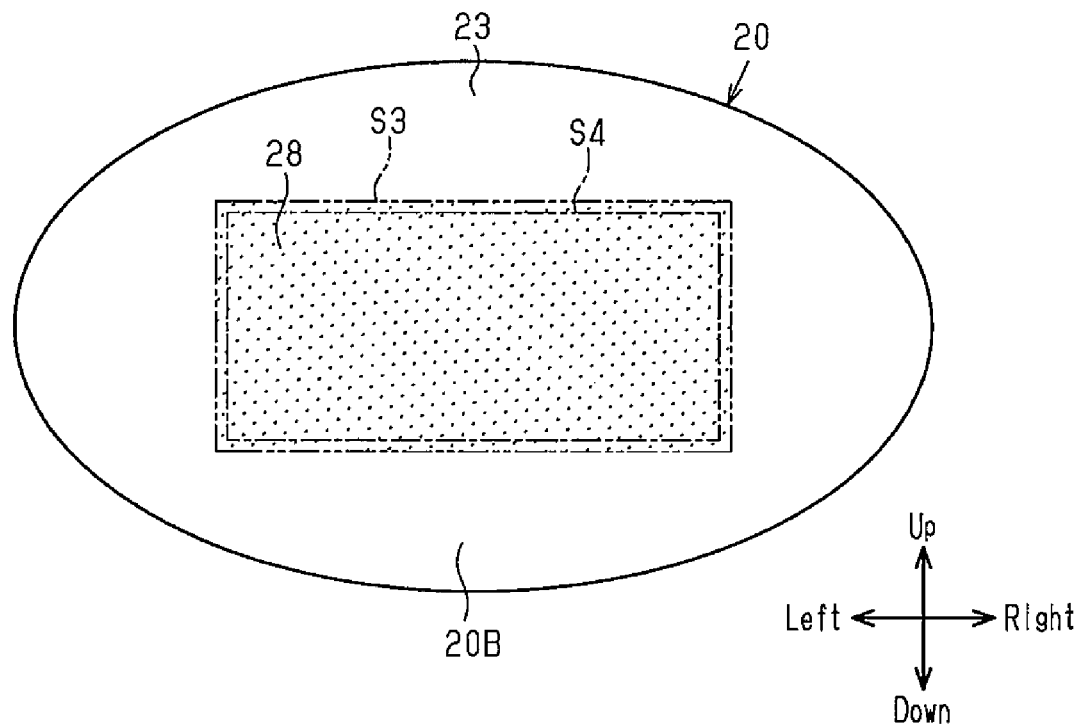
FIG. 4 is a rear view of the cover.

As shown in FIG. 4, the uneven surface 28 is formed in the entirety of a rectangular formation area S3 (the stippled portion in FIG. 4), which is provided in the center portion of the back side 20B of the cover 20. FIG. 4 shows a radio wave transparent area S4 (the area surrounded by the long dashed short dashed line in FIG. 4), through which radio waves emitted from the radio wave radar device 11 pass. As shown in FIG. 4, the formation area S3 of the uneven surface 28 includes the entire radio wave transparent area S4. Specifically, the formation area S3 is slightly larger (by, for example, a few millimeters) than the radio wave transparent area S4 in the four directions: upward, downward, leftward, and rightward.

Figure 5:
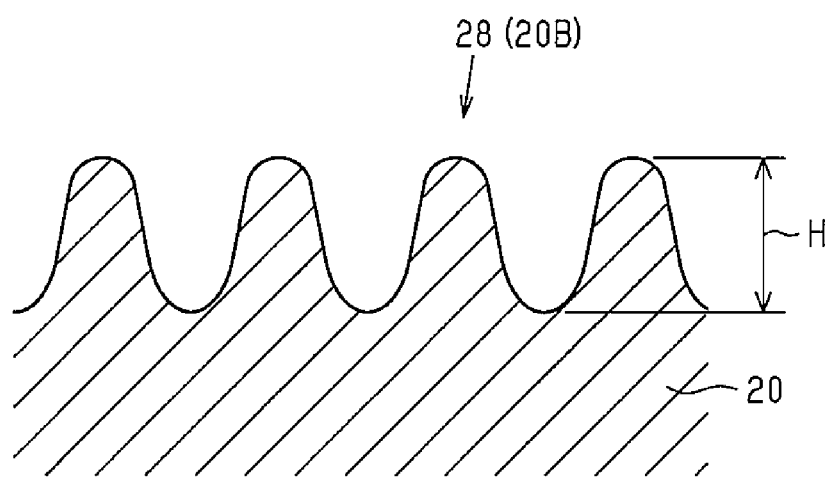
FIG. 5 is a schematic diagram illustrating the depth of embossing.

The uneven surface 28 is embossed (specifically, embossed to form a matte finish effect). The embossed surface of the uneven surface 28 has an embossing depth of 10 µm. As shown in FIG. 5, the embossing depth is the height from the bottom of the concave part to the tip of the convex part (the height indicated by H in FIG. 5) in the uneven surface 28.

An operation of the cover 20 will now be described.

Figure 6:
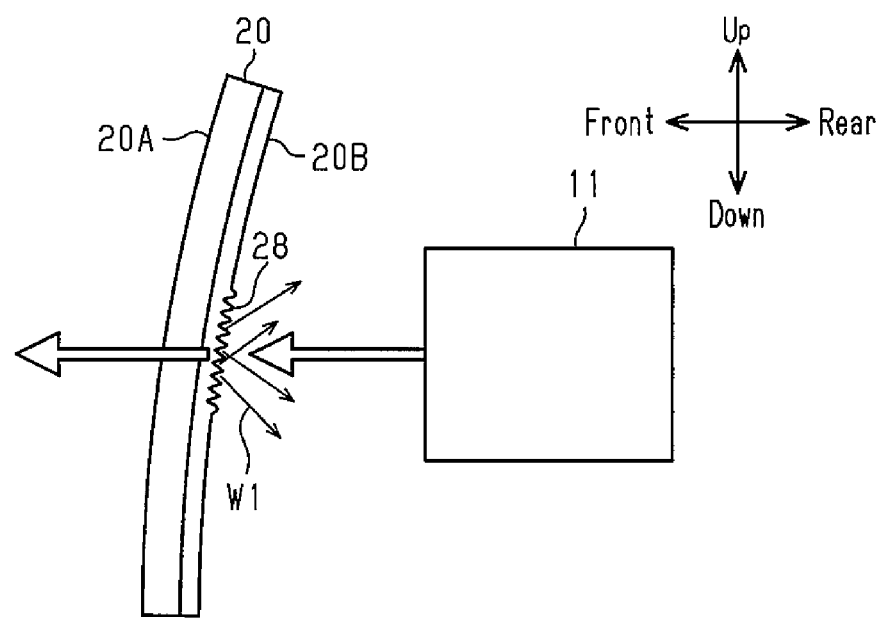
FIG. 6 is a schematic diagram illustrating an operation of the cover.

As shown in FIG. 6, radio waves emitted from the radio wave radar device 11 (indicated by the blank arrows in the drawing) pass through the cover 20 and are emitted to the outside of the vehicle 10. At this time, some of the radio waves emitted from the radio wave radar device 11 are reflected by the back side 20B of the cover 20 before passing through the cover 20 and return to the inside of the vehicle 10.

As shown in FIG. 6, the part of the back side 20B of the cover 20 through which radio waves pass (radio wave transparent area S4, see FIG. 4), that is, the part irradiated with radio waves emitted from the radio wave radar device 11 is the uneven surface 28. Therefore, when radio waves are reflected by the back side 20B (uneven surface 28) of the cover 20 as indicated by arrows W1 in FIG. 6, the radio waves are reflected diffusely by the irregularities of the uneven surface 28. This reduces the radio field intensity of the radio waves received by the radio wave radar device 11 (hereinafter, referred to as "noise reflection waves") in the radio waves reflected by the back side 20B of the cover 20 (the surface reflected waves). The configuration thus limits the influence of the surface reflected waves when the radio wave radar device 11 detects a detection object. Accordingly, the detection accuracy of the radio wave radar device 11 is improved.

When the uneven surface 28 of the back side 20B of the cover 20 is irradiated with the radio waves emitted from the radio wave radar device 11, the radio field intensity of the noise reflection waves is reduced by the diffusion of the radio waves at the uneven surface 28 regardless of the installation angle of the cover 20. Thus, the cover 20 shown in FIG. 6 reduces the influence of the cover installation angle on an attempt to increase the detection accuracy of the radio wave radar device 11, as compared to a cover of a comparative example in which the radio wave transparent area S4 of the back side 20B is a smooth surface. Therefore, the installation angle of the cover 20 shown in FIG. 6 can be set more freely than that of the cover of the comparative example.

As shown in FIG. 4, the entire radio wave transparent area S4 in the back side 20B of the cover 20, that is, the entire portion capable of diffusing the surface reflected waves by irregularities, forms the uneven surface 28. Therefore, as compared with a case in which only a part of the radio wave transparent area S4 is an uneven surface, the radio field intensity of the noise reflection waves is reduced by properly diffusing the radio waves when the radio waves are reflected by the back side 20B of the cover 20.

The cover 20 is an exterior component of the vehicle 10 and has a structure such that the ornamental member (the paint layer 24 and the metal film layer 25) can be seen through the transparent front member (the hard coating layer 27 and the surface covering plate 26) from the outside of the vehicle 10. In addition, the cover 20 is opaque on the inner side (base 23), and the back side 20B, which forms the surface on the inner side, cannot be seen from the outside of the vehicle 10. The irregularities (uneven surface 28) for diffusing the reflected waves are formed on the back side 20B of the cover 20. The irregularities are thus provided on the cover 20 without degrading the aesthetic appearance of the cover 20 itself and the aesthetic appearance of the vehicle 10 provided with the cover 20.

Prior to determining the embossing depth of the embossed surface, included in the uneven surface 28, experiments were conducted to measure the relationship between the return loss of radio waves by the cover 20 and the embossing depth. These experiments were conducted on experimental covers and comparative covers. The experimental covers had back sides that had been subjected to embossing through etching and shot blasting with alumina particles and glass beads to obtain embossed surfaces (uneven surfaces) of different embossing depths (5 μm to 200 μm). The comparative covers were made so that the radio wave transparent areas S4 of the back sides were smooth. Then, the experimental cover (or the comparative cover) was placed in front of the radio wave radar device 11 in the radio wave emitting direction, and the return loss of radio waves by the cover when the radio waves were emitted toward the back side of the cover by the radio wave radar device 11 was measured.

Figure 7:
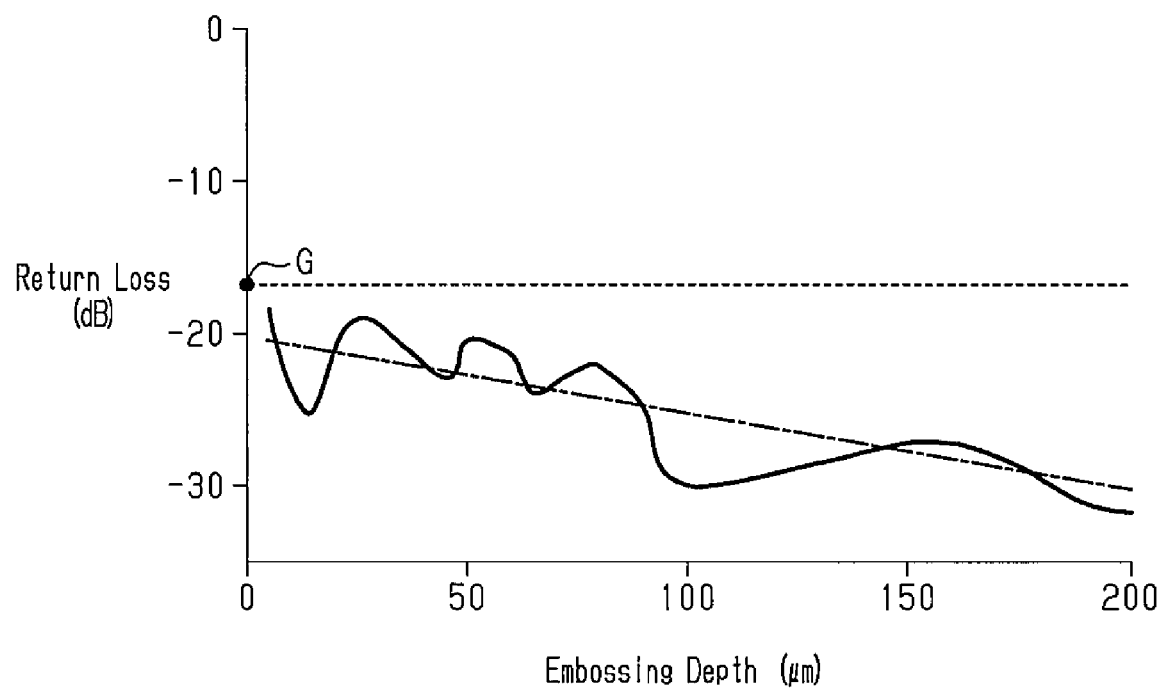
FIG. 7 is a graph showing the relationship between the embossing depth and the return loss of the cover.

FIG. 7 shows the results of measurement of the above relationship. The graph shows that the greater the absolute value of the return loss, the more reduced the radio field intensity of the noise reflection waves became, and the smaller the influence became on the detection accuracy of the radio wave radar device 11 by the noise reflection wave.

The solid line in FIG. 7 indicates that, when the embossing depth of the embossed surface formed on the back side 20B of the cover 20 was set within the experimental range (5 μm to 200 μm), the absolute value of the return loss of radio waves by the cover 20 was greater than the absolute value of the return loss of radio waves by the comparative cover (indicated by G in FIG. 7). This demonstrates that, by forming an embossed surface having an embossing depth in the above range (5 μm to 200 μm) on the back side 20B (uneven surface 28) of the cover 20, the influence on the detection accuracy of the radio wave radar device 11 due to the noise reflection waves was limited as compared with a case in which the radio wave transparent area S4 on the back side was a smooth surface.

In addition, the long dashed short dashed line in FIG. 7 shows that, when the embossing depth was set in the above range (5 μm to 200 μm), the greater the embossing depth, the greater the absolute value of the return loss of radio waves due to the cover 20 tended to be. This shows that the greater the embossing depth, the smaller the influence on the detection accuracy of the radio wave radar device 11 due to the noise reflected waves becomes. However, if the embossing depth is excessive, the thickness of the base 23 partially becomes small, resulting in a reduced strength and an increased difficulty in forming the embossed surface.

These experimental results show that the preferable range of the embossing depth of the embossed surface of the uneven surface 28 is from 10 μm to 50 μm, inclusive. Accordingly, the embossing depth of the embossed surface included in the uneven surface 28 of the cover 20 is set to 10 μm.

The results of the various experiments demonstrated that there was no significant difference in the attenuation of radio waves due to the cover between a case in which the radio wave transparent area S4 of the back side 20B of the cover 20 had an embossed surface of an embossing depth in the above range (5 μm to 200 μm) and a case in which the radio wave transparent area S4 was a smooth surface (specifically, the attenuation remained in the range between −0.25 dB and −0.30 dB inclusive). Thus, although the radio wave transparent area S4 of the back side 20B of the cover 20 includes the embossed uneven surface 28, the radio field intensity of the emitted waves emitted to the outside of the vehicle 10 through the cover 20 is not significantly changed as compared with the comparative cover, in which the radio wave transparent area S4 of the back side 20B includes a smooth surface. Therefore, although the embossed uneven surface 28 is formed on the back side 20B of the cover 20 in order to limit the influence of the noise reflection waves, the uneven surface 28 does not reduce the detection accuracy of the detection of an object by the radio wave radar device 11 using emitted waves.

As described above, embodiments provide the following advantages.

(1) The radio wave transparent area S4 in the back side 20B of the cover 20 includes the uneven surface 28, which has an embossing surface of an embossing depth of, for example, 10 μm. This configuration may limit the influence of the surface reflected waves when the radio wave radar device 11 detects an object, thereby improving the detection accuracy of the radio wave radar device 11. Moreover, compared to the comparative cover, in which the radio wave transparent area S4 of the back side 20B includes a smooth surface, a wider range of installation angles of the cover 20 may be used.

(2) The entire radio wave transparent area S4 in the back side 20B of the cover 20 is formed by the uneven surface 28. This may reduce the radio field intensity of the noise reflection wave.

(3) The portion of the cover 20 (vehicle exterior component) on the inner side (base 23) is made of an opaque material, and a part of the back side 20B, which is the surface on the inner side of the base 23, is the uneven surface 28. As a result, irregularities for diffusing the surface reflected waves are formed on a portion of the cover 20 that cannot be seen from the outside of the vehicle 10, without reducing the aesthetic appearance of the vehicle 10.

(4) The cover 20 has a structure in which the ornamental member (the paint layer 24 and the metal film layer 25) can be seen through the transparent front member (the hard coating layer 27 and the surface covering plate 26) from the outside of the vehicle 10. Irregularities for diffusing surface reflected waves can be formed on the cover 20 without degrading the aesthetic appearance of the cover 20.

<Modifications>

The above-described embodiments may be modified as follows.

The embossing depth of the embossed surface included in the uneven surface 28 can be changed within the range of 5 μm to 200 μm, inclusive. In this case, it is also possible to make the embossing depths of different parts of the uneven surface 28 non-uniform, for example, by making the embossing depth in the central part greater than the embossing depth of the peripheral part of the uneven surface 28.

The irregularities included in the uneven surface 28 in the back side 20B of the cover 20 are not limited to a matte finished surface. Any pattern of irregularities including an embossed surface of a woven pattern, an embossed surface of a hairline pattern, and an embossed surface of geometric pattern can be employed. Thus, the irregularities may have a regular or irregular form.

The entire back side 20B of the cover 20 may be formed by an uneven surface 28 that includes predetermined irregularities (for example, a matte finished embossed surface). It is also possible to make only a part of the radio wave transparent area S4 an uneven surface 28 including predetermined irregularities.

Figure 8:
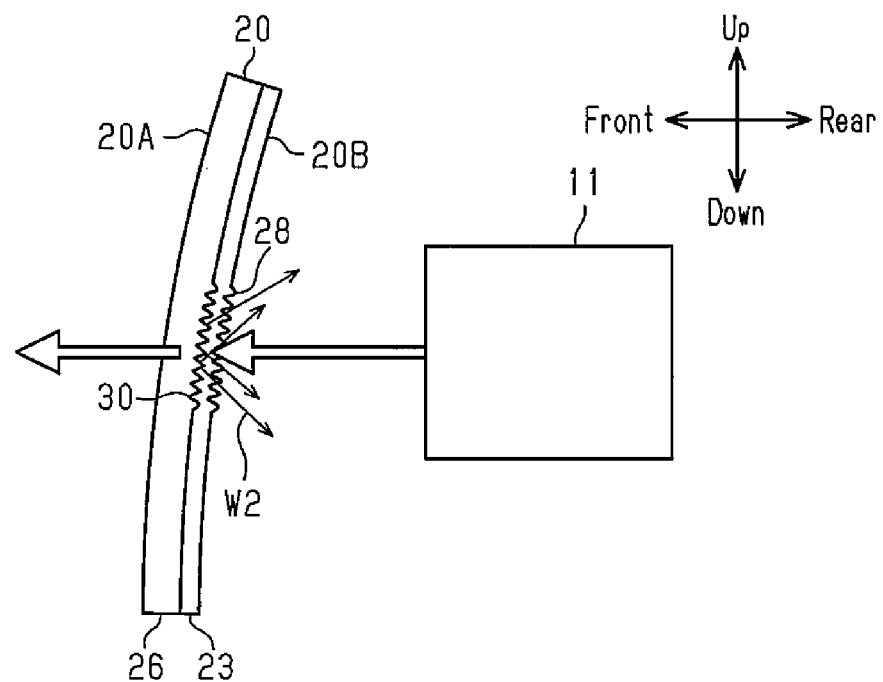
FIG. 8 is a schematic diagram showing the side structure of a radio wave transparent cover according to a modification.
Figure 9:
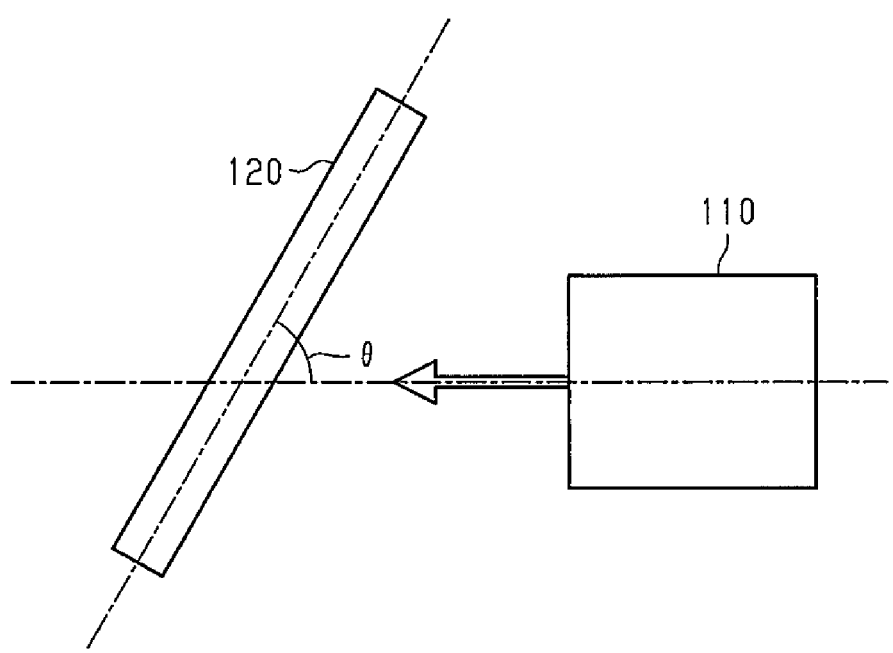
FIG. 9 is a schematic diagram showing an arrangement of a radio wave transparent cover and a radio wave radar device of a related art.

As conceptually illustrated in FIG. 8, an uneven surface 30 including an embossed surface with an embossing depth in the range of 5 μm to 200 μm, inclusive, may be formed on a part or the whole of the radio wave transparent area (see S2 in FIG. 3) on the opposed surfaces of the base 23 and the surface covering plate 26 (more specifically, the surface on the outer side of the base 23 and the surface on the inner side of the outer covering plate 26). With this configuration, although some of the radio waves emitted from the radio wave radar device 11 are reflected inside the cover 20 (specifically, on the opposed surfaces of the base 23 and the surface covering plate 26), the reflected radio waves are diffused by the irregularities of the uneven surface 30 (shown by arrows W2 in FIG. 8). This reduces the radio field intensity of the radio waves received by the radio wave radar device 11 (noise reflection waves) in the radio waves reflected inside the cover 20. Accordingly, the detection accuracy of the radio wave radar device 11 may be improved.

An uneven surface composed of predetermined irregularities (for example, a matte finished embossed surface) may be formed in the radio wave transparent area S1 (see FIG. 2) on the front side 20A of the cover 20. With such a configuration, although some of the radio waves emitted from the radio wave radar device 11 are reflected by the front side 20A of the cover 20 (specifically, the interface between the front side 20A and the air), the reflected radio waves are diffused by the irregularities of the front side 20A of the cover 20. This may reduce the radio field intensity of the radio waves received by the radio wave radar device 11 (noise reflection waves) in the radio waves reflected by the front side 20A of the cover 20.

The surface covering plate 26 and the hard coating layer 27 may be made of a colored transparent (for example, black transparent or blue transparent) material.

The configuration that forms the uneven surface 28 in the cover 20 can be employed in a cover of which the outer portion is formed by an opaque material, such as a radio wave transparent cover that is entirely made of an opaque material.

The cover 20 of the above-described embodiments can also be used as a radio wave transparent cover arranged at a position that cannot be seen from the outside of the vehicle.

The cover 20 of the above-described embodiments can also be used in a vehicle equipped with a radio wave radar device that emits microwaves.

The invention claimed is:

1. A radio wave transparent cover configured to be arranged in front of a radio wave radar device with a space in between in a radio wave emitting direction of the radio wave radar device such that radio waves emitted from the radio wave radar device pass through the inside of the radio wave transparent cover, the radio wave transparent cover comprising:

a first surface configured to be positioned on a side facing the radio wave radar device, and wherein
the first surface has first and second areas through which a first portion of emitted radio waves pass and on which a second portion of the emitted radio waves are reflected,
the first area of the first surface is a textured surface having height differences in a range from 5 μm to 200 μm, inclusive, and
the first area of the first surface is configured to reflect the second portion of the emitted radio waves more diffusely than the second area of the first surface reflects the second portion of the emitted radio waves.

2. The radio wave transparent cover according to claim 1, wherein the area through which the emitted radio waves pass is entirely formed by the textured surface.

3. The radio wave transparent cover according to claim 1, wherein
the radio wave transparent cover is a vehicle exterior component, of which a surface on a side opposite from the radio wave radar device forms an outer surface of a vehicle, and
at least a portion on the side facing the radio wave radar device comprises an opaque material.

4. The radio wave transparent cover according to claim 3, further comprising:
a front member comprising a transparent material and forming a portion of the radio wave transparent cover on a front side in the radio wave emitting direction;
a base comprising an opaque material and forming a portion of the radio wave transparent cover on a rear side in the radio wave emitting direction; and
an ornamental member, which is disposed between the front member and the base.

5. The radio wave transparent cover according to claim 1, further comprising:
a front member forming a portion of the radio wave transparent cover on a front side in the radio wave emitting direction; and
a base forming a portion of the radio wave transparent cover on a rear side in the radio wave emitting direction, wherein
opposed surfaces of the front member and the base have a common area through which the emitted radio waves pass, and
the common area includes a textured surface having height differences in a range from 5 μm to 200 μm, inclusive.

6. The radio wave transparent cover according to claim 1, wherein
the second area of the first surface is a non-textured surface.

7. The radio wave transparent cover according to claim 1, wherein
the radio wave transparent cover further comprises:
a second surface configured to be positioned on a side facing away from the radio wave radar device, and
the second surface is substantially smooth.

* * * * *